(12) United States Patent
Su et al.

(10) Patent No.: US 8,201,952 B2
(45) Date of Patent: Jun. 19, 2012

(54) PROJECTION APPARATUS AND PROJECTION SYSTEM COMPRISING THE SAME

(75) Inventors: Jimmy Su, Taoyuan Hsien (TW); Yu-Shan Lai, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 449 days.

(21) Appl. No.: 12/616,507

(22) Filed: Nov. 11, 2009

(65) Prior Publication Data

US 2010/0125350 A1    May 20, 2010

(30) Foreign Application Priority Data

Nov. 18, 2008   (TW) ................................ 97144485 A

(51) Int. Cl.
*G03B 21/14* (2006.01)
*G06F 17/00* (2006.01)
*G06F 1/12* (2006.01)
*G06F 15/16* (2006.01)

(52) U.S. Cl. ............. 353/121; 353/122; 352/40; 702/89

(58) Field of Classification Search .................. 353/121, 353/122; 352/40, 38; 702/85, 89; 715/733, 715/734, 736

See application file for complete search history.

(56) References Cited

U.S. PATENT DOCUMENTS

| | | | |
|---|---|---|---|
| 7,199,857 B2 * | 4/2007 | Paige et al. ..................... 352/40 |
| 2002/0069107 A1 * | 6/2002 | Werner ........................... 705/14 |
| 2003/0048418 A1 * | 3/2003 | Hose et al. ..................... 352/123 |
| 2005/0062935 A1 * | 3/2005 | Bubie et al. ..................... 352/40 |
| 2005/0168603 A1 | 8/2005 | Hiyama et al. |
| 2005/0174482 A1 | 8/2005 | Yamada et al. |

* cited by examiner

*Primary Examiner* — William C Dowling

(74) *Attorney, Agent, or Firm* — Patterson Thuente Christensen Pedersen, P.A.

(57) ABSTRACT

A projection apparatus and a projection system comprising the same are provided. The projection apparatus is adapted to connect to a server for transmitting a time signal via a network. The projection apparatus comprises a schedule module, a timing module, and a network process module. The schedule module is configured to store schedule information. The timing module is configured to generate time information. The network process module is coupled to the schedule module and the timing module, and configured to connect to the server to get time signal via the network according to the schedule information and timing information in a specific time.

17 Claims, 2 Drawing Sheets

PROJECTION APPARATUS AND PROJECTION SYSTEM COMPRISING THE SAME

This application claims priority to Taiwan Patent Application No. 097144485 filed on Nov. 18, 2008.

CROSS-REFERENCES TO RELATED APPLICATIONS

Not applicable.

BACKGROUND OF THE INVENTION

1. Field of the Invention

The present invention provides a projection apparatus and a projection system comprising the same. More specifically, the present invention provides a projection apparatus adapted to connect via a network to a server that is configured to transmit a time signal, and a projection system comprising the same.

2. Descriptions of the Related Art

Projection apparatuses have been widely used in various meetings, briefings, school teaching and any activities involving idea expression. As a result of need for management, a central-control framework of projection apparatuses has been disclosed in the prior art, which comprises a central control terminal and a plurality of projection apparatuses. The central control terminal is connected to the individual projection apparatuses via a local network to manage or schedule the projection apparatuses in a centralized way. For example, each of the projection apparatuses can be scheduled or managed by the central control terminal to execute a specific operation (e.g., turn-on or -off) synchronously in a specific time.

On the other hand, to enhance the additional value of the projection apparatuses, the prior art has also disclosed that a timing module (e.g., an oscillator) may be disposed in a projection apparatus to provide a timing function. However, when turned off, the common projection apparatus generally has it power supply cut off until the next time it is turned on. In this case, because the projection apparatus is in a powered off state before it is turned on again, the timing module thereof tends to become inaccurate due to the extended period in the off state. In view of this, the prior art has also disclosed that the central control terminal of the projection apparatus may be connected to a network time protocol (NTP) server via an internet to receive a time signal transmitted by the NTP server. According to the time signal, the central control terminal calibrates the time of the timing module of the projection apparatus so that the timing module does not become more inaccurate due to the extended period of in the off state.

Even though the projection apparatuses of the prior art can be scheduled and managed by the central control terminal to execute a specific operation in a specific time and can be connected to an NTP server via the central control terminal for time calibration, the framework relying on the central control terminal to accomplish the scheduling, management and time calibration lacks flexibility in use and also adds to the cost of schools, companies and institutions using the framework. Furthermore, in case the central control terminal fails or is otherwise unable to operate, the individual projection apparatuses will be unable to play the scheduling and time calibration functions on their own.

Accordingly, it is highly desirable in the art to enable one or more projection apparatuses to execute specific operations in a specific time according to a schedule set by a user and to execute a time calibration procedure without need of being connected to a central control terminal.

SUMMARY OF THE INVENTION

One objective of the present invention is to provide a projection apparatus and a projection system comprising the same. The projection apparatus is adapted to connect via a network to a server configured to transmit a time signal, and store schedule information and time information. The projection apparatus can execute a specific operation in a specific time according to the schedule information and time information. Furthermore, after receiving the time signal, the projection apparatus can calibrate the time information according to the time signal. As a result, the projection apparatus is able to execute a time calibration procedure and a specific schedule without assistance from a central control terminal.

To this end, the projection apparatus of the present invention comprises a schedule module, a timing module and a network process module. The schedule module is configured to store the schedule information. The timing module is configured to generate the time information. The network process module is coupled to the schedule module and the timing module, and configured to connect to the server via the network to obtain the time signal according to the schedule information and the timing information in a specific time. The timing module is further configured to calibrate the time information according to the time signal from the network process module.

Also to this end, the projection system of the present invention comprises a personal computer (PC) and a projection apparatus. The PC is configured to transmit a time signal. The projection apparatus comprises a schedule module, a timing module and a network process module. The schedule module is configured to store the schedule information. The timing module is configured to generate the time information. The network process module is coupled to the schedule module and the timing module, and configured to obtain the time signal via the local network according to the schedule information and the time information in a specific time. The timing module is further configured to calibrate the time information according to the time signal from the network process module.

According to the above description, the projection apparatus of the present invention is able to, according to the schedule information and the time information, execute a specific operation in a specific time and connect via a network to the server that is configured to transmit a time signal, thereby obtaining the time signal and calibrating the time information according to the time signal. Thus, the present invention is able to execute scheduling and time calibration operations without assistance from a central control terminal, thus overcoming drawbacks of the prior art effectively.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

In the following description, the present invention will be explained with reference to embodiments thereof. However, these embodiments are not intended to limit the present invention to any specific environment, applications or particular implementations described in these embodiments. Therefore, description of these embodiments is only for purposes of illustration rather than limitation. It should be appreciated that in the following embodiments and the attached drawings, elements unrelated to the present invention are omitted from illustration.

Figure 1:
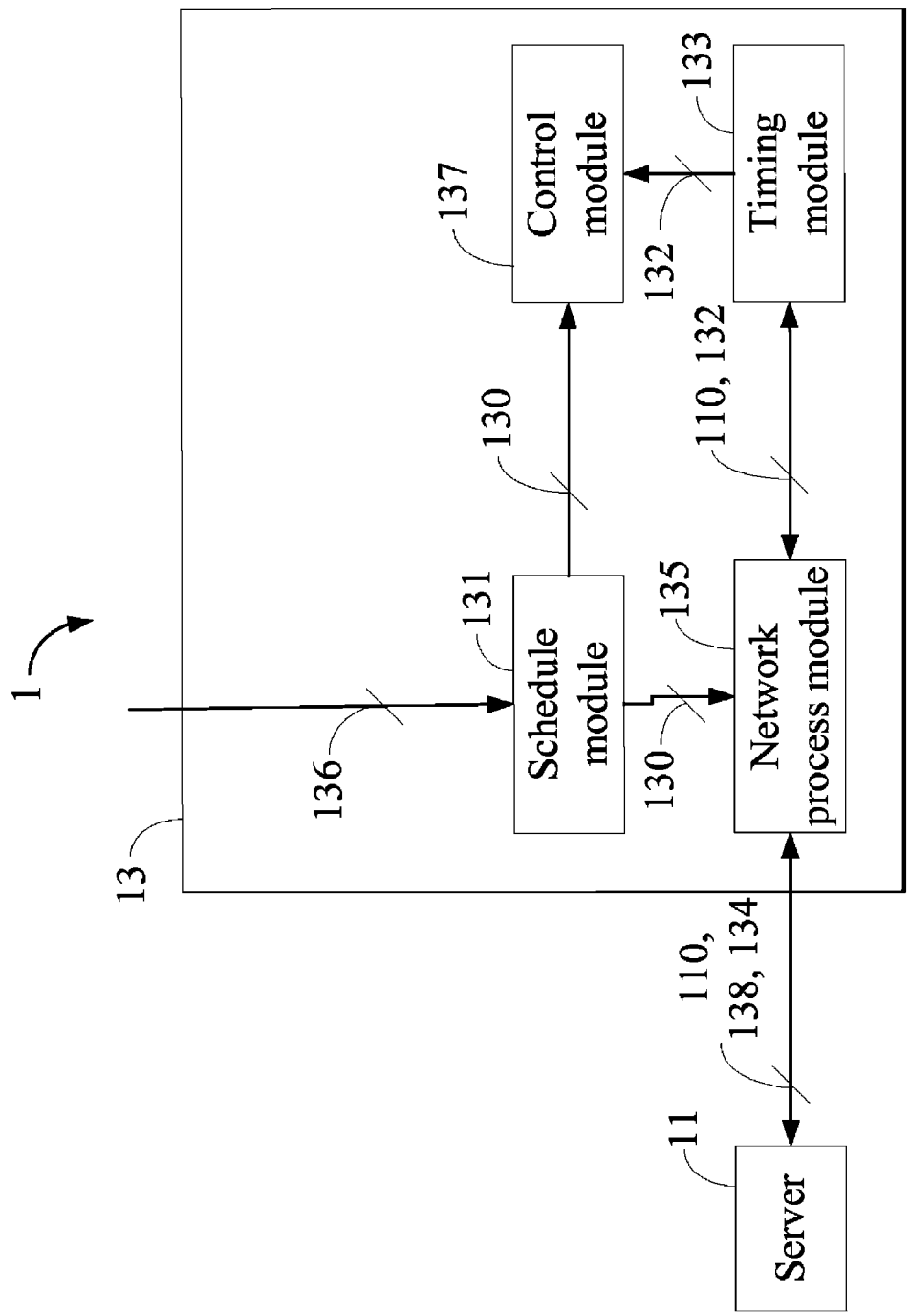
FIG. 1 is a schematic view of a projection system of the first embodiment of the present invention.

A first embodiment of the present invention is illustrated in FIG. 1, which is a schematic view of a projection system 1. The projection system 1 comprises a server 11 and a projection apparatus 13. The server 11 is configured to transmit a time signal 110, while the projection apparatus 13 is adapted to connect to the server 11 via a network (not shown). It should be noted that the network conforms to a wireless network standard or a wired network standard, and this does not limit the scope of the present invention.

The projection apparatus 13 comprises a schedule module 131, a timing module 133, a network process module 135 and a control module 137. The schedule module 131 is configured to receive a user setting 136 and, according to the user setting 136, generate and store schedule information 130. The timing module 133 is configured to generate time information 132. The network process module 135 is coupled to the schedule module 131 and the timing module 133, and is configured to connect to the server 11 via the network to obtain the time signal 110 according to the schedule information 130 and the time information 132 in the first specific time. The timing module 133 is further configured to calibrate the time information 132 according to the time signal 110 from the network process module 135.

Furthermore, the control module 137 is coupled to the schedule module 131 and the timing module 133, and is configured to enable the projection apparatus 13 to turn from the first status into a second status according to the schedule information 130 and the time information 132 (or the calibrated time information 132) in a second specific time. Specifically, the control module 137 enables the projection apparatus 13 to turn from a start status into a standby status or vice versa in the second specific time.

Particularly, in this embodiment, the timing module 133 has a function similar to a clock, and is configured to generate the time information 132 so that the individual modules of the projection apparatus 13 can execute corresponding operations according to the time information 132 and the schedule information 130 depending on practical conditions. To illustrate this more clearly, it is assumed that the schedule information 130 generated by the schedule module 131 of the projection apparatus 13 according to the user setting 136 comprises the following information:

(1) At 8:00 a.m. every day, the projection apparatus 13 should connect to the server 11 via the network to obtain the time signal 110 so that the timing module 133 can calibrate the time information 132 according to the time signal 110;

(2) At 9:00 a.m. every day, the projection apparatus 13 should turn from the standby status into the start status; and (3) At 6:00 p.m. every day, the projection apparatus 13 should turn from the start status into the standby status.

Then, according to the schedule information 130 and the time information 132, the network process module 135 of the projection apparatus 13 connects to the server 11 via the network at 8:00 a.m. every day (which may be considered as the first specific time) to obtain the time signal 110, so that the timing module 133 can calibrate the time information 132 according to the time signal 110. Through this time calibration operation, the time information 132 generated by the timing module 133 is made to be synchronous with the server 11 to decrease the likelihood of getting inaccurate time information 132. Additionally, according to the schedule information 130 and the time information 132, the control module 137 of the projection apparatus 13 enables the projection apparatus 13 to turn from the standby status into the start status at 9:00 a.m. every day and to turn from the start status into the standby status at 6:00 p.m. every day.

It should be noted that in this embodiment, the network may be an Internet, and the server 11 may be a network time protocol (NTP) server. The network process module 135 of the projection apparatus 13 is configured to obtain the time signal transmitted by the NTP server via the Internet. The NTP server may be implemented according to conventional technology and thus will not be further described herein.

In other embodiments, the network may also be a local network. Correspondingly, the server 11 may be a personal computer (PC) using a customized time protocol and it can transmit the time signal according to the customized time protocol. The network process module 135 of the projection apparatus 13 also obtains the time signal transmitted by the personal computer via the local network according to the customized time protocol. Thereby, even when the projection apparatus 13 fails to connect to the Internet, it can still find the PC in the local network and execute time calibration via the local network.

Aside from automatically connecting to the server 11 to receive the time signal 110 in a first specific time, the projection apparatus 13 may further transmit a time request signal to the server 11 which then, according to the time request signal, transmits a time signal 110. Specifically, the network process module 135 of the projection apparatus 13 is adapted to transmit a time request signal 138 to the NTP server via the Internet so that the NTP server transmits a time signal according to the time request signal.

Furthermore, the network process module 135 of the projection apparatus 13 may also transmit a time request signal 134 to the PC via the local network according to the customized time protocol so that the PC then transmits a time signal according to the customized time protocol of the time request signal 138. In other words, the transmission mechanism of the time signal between the network process module 135 of the projection apparatus 13 and the server 11 may be adjusted depending on the practical conditions rather than being limited thereto.

With the aforementioned arrangement, the projection apparatus of the present invention is able to, according to the schedule information and the time information, execute a specific operation in a specific time and connect via a network to the server that is configured to transmit a time signal, thereby obtaining the time signal and calibrate the time information according to the time signal.

Figure 2:
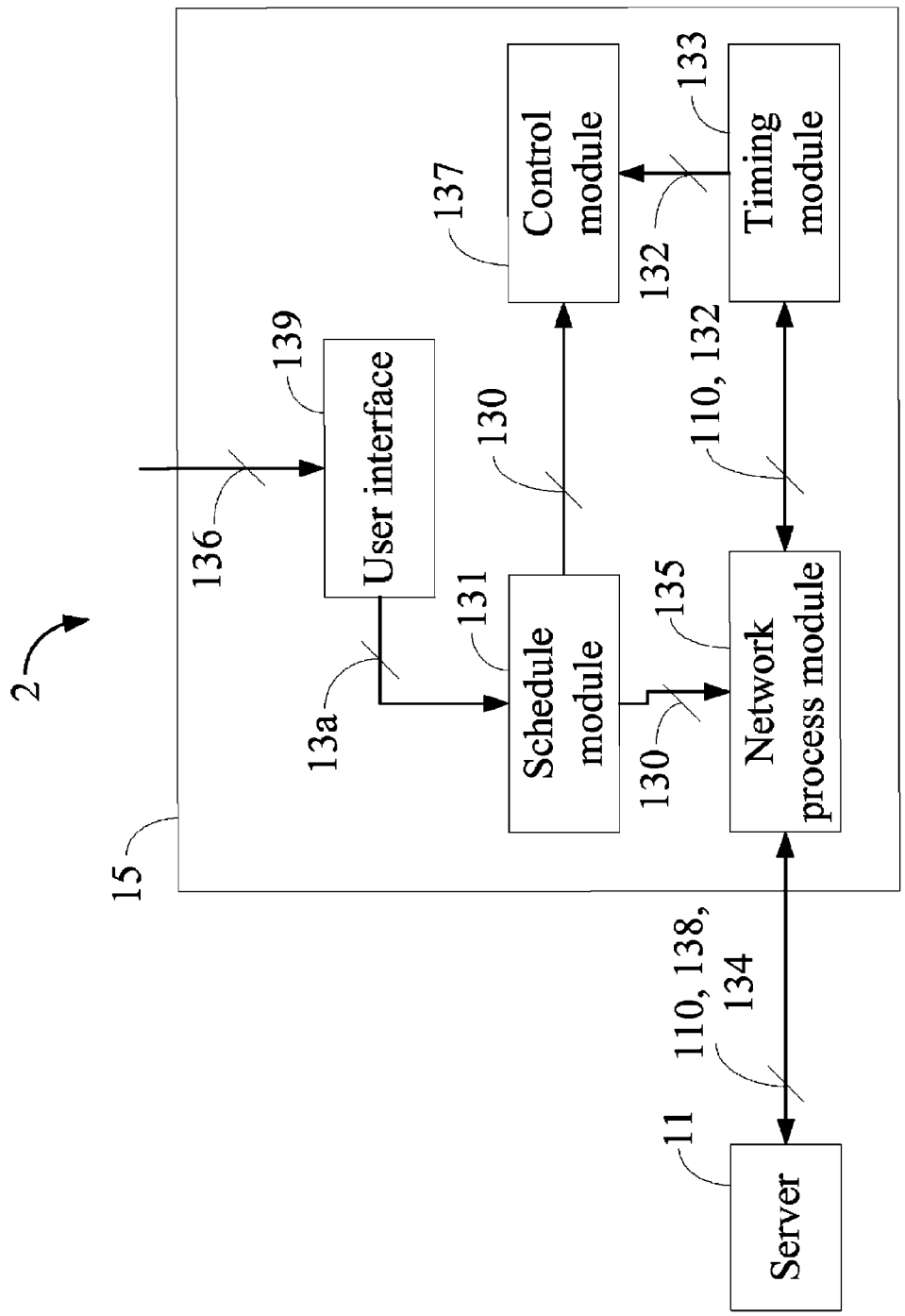
FIG. 2 is a schematic view of a projection system of the second embodiment of the present invention.

A second embodiment of the present invention is illustrated in FIG. 2, which is a schematic view of a projection system 2. Portions of the projection system 2 identical to the projection system 1 of the first embodiment will be omitted from description herein, and only differences will be described hereinafter. The projection apparatus 2 comprises a server 11 and a projection apparatus 15. The functionalities of the server 11 have already been described in the first embodiment and thus will not be further described herein.

The projection apparatus 15 comprises a schedule module 131, a timing module 133, a network process module 135, a control module 137 and a user interface 139. Functionalities of the timing module 133, the network process module 135 and the control module 137 have already been described in the first embodiment and thus will not be further described herein. The user interface 139, which is coupled to the schedule module 131, is configured to receive a user setting 136 and generate a setting signal 13a according to the user setting 136. The schedule module 131 is configured to receive the setting signal 13a and generate the schedule information 130 as described in the first embodiment according to the setting signal 13a. In this embodiment, the user interface 139 is an on-screen display (OSD) interface. In other embodiments, the user interface 139 may be other modules that can function as a user interface, for example, a liquid crystal display (LCD) panel or a key module, although it is not merely limited thereto.

According to the above description, the projection apparatus of the present invention is able to, according to the schedule information and the time information, execute a specific operation in a specific time and connect via a network to the server that is configured to transmit a time signal, thereby, obtaining the time signal and calibrate the time information according to the time signal. Thus, the present invention is able to execute scheduling and time calibration operations without assistance from a central control terminal, thus overcoming drawbacks of the prior art effectively.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A projection apparatus being adapted to connect to a server via a network, the server being configured to transmit a time signal, the projection apparatus comprising:
   a schedule module, being configured to store schedule information;
   a timing module, being configured to generate time information; and
   a network process module, being coupled to the schedule module and the timing module, and configured to connect to the server via the network to obtain the time signal according to the schedule information and the timing information in a first specific time;
   wherein the timing module is further configured to calibrate the time information according to the time signal from the network process module.

2. The projection apparatus as claimed in claim 1, wherein the schedule module is further configured to receive a user setting, and generate and store the schedule information according to the user setting.

3. The projection apparatus as claimed in claim 1, further comprising an user interface coupled to the schedule module, the user interface being configured to receive the user setting and generate a setting signal according to the user setting, and the schedule module being further configured to generate and store the schedule information according to the setting signal.

4. The projection apparatus as claimed in claim 1, wherein the server is a network time protocol (NTP) server, the network is an internet, and the network process module is configured to connect to the NTP server via the internet to obtain the time signal according to the schedule information and the time information in the first specific time.

5. The projection apparatus as claimed in claim 4, wherein the network process module is further configured to transmit a time request signal to the NTP server, and the NTP server transmits the time signal according to the time request signal.

6. The projection apparatus as claimed in claim 1, wherein the server is a personal computer (PC), the network is a local network, and the network process module is configured to connect to the PC via the local network to obtain the time signal according to the schedule information and the time information in the first specific time.

7. The projection apparatus as claimed in claim 6, wherein the network process module is further configured to transmit a time request signal to the PC, and the PC transmits the time signal according to the time request signal.

8. The projection apparatus as claimed in claim 1, further comprising a control module coupled to the schedule module and the timing module, and the control module being configured to enable the projection apparatus to turn from a first status to a second status according to the schedule information and the time information in a second specific time.

9. The projection apparatus as claimed in claim 8, wherein the first status of the projection apparatus is a standby status, and the second status of the projection apparatus is a start status.

10. The projection apparatus as claimed in claim 8, wherein the first status of the projection apparatus is a start status, and the second status of the projection apparatus is a standby status.

11. A projection system, comprising:
    a personal computer (PC), being configured to transmit a time signal; and
    a projection apparatus, being adapted to connect to the PC via a local network to obtain the time signal, the projection apparatus comprising:
    a schedule module, being configured to store schedule information;
    a timing module, being configured to generate time information; and
    a network process module, being coupled to the schedule module and the timing module and configured to obtain the time signal via the local network according to the schedule information and the time information in a first specific time;
    wherein the timing module is further configured to calibrate the time information according to the time signal from the network process module.

12. The projection system as claimed in claim 11, wherein the projection apparatus transmits a time request signal to the PC via the network process module, and the PC transmits the time signal according the time request signal.

13. The projection system as claimed in claim 11, wherein the schedule module is further configured to receive a user setting, and generate and store the schedule information according to the user setting.

14. The projection system as claimed in claim 11, wherein the projection apparatus further comprises an user interface coupled to the schedule module, the user interface is configured to receive a setting signal and generate a setting signal according to the user setting, and the schedule module is further configured to generate and store the schedule information according to the setting signal.

15. The projection system as claimed in claim 11, wherein the projection apparatus further comprises a control module coupled to the schedule module and the timing module, and the control module is configured to enable the projection apparatus from a first status to a second status according to the schedule information and the time information in a second specific time.

16. The projection system as claimed in claim 15, wherein the first status of the projection apparatus is a standby status, and the second status of the projection apparatus is a start status.

17. The projection apparatus as claimed in claim 15, wherein the first status of the projection apparatus is a start status, and the second status of the projection apparatus is a standby status.

* * * * *